(12) United States Patent
Gormley

(10) Patent No.: US 6,967,937 B1
(45) Date of Patent: Nov. 22, 2005

(54) COLLISION-FREE MULTIPLE ACCESS RESERVATION SCHEME FOR MULTI-TONE MODULATION LINKS

(75) Inventor: Eamonn Gormley, Seattle, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 1121 days.

(21) Appl. No.: 09/618,653

(22) Filed: Jul. 18, 2000

Related U.S. Application Data

(60) Provisional application No. 60/172,417, filed on Dec. 17, 1999.

(51) Int. Cl.[7] .............................................. H04Q 7/00
(52) U.S. Cl. ..................................... 370/330; 370/338
(58) Field of Search ................................ 370/203, 204, 370/210, 280, 281, 294, 295, 322, 329, 336, 370/344, 347, 436, 442, 447, 461, 464

(56) References Cited

U.S. PATENT DOCUMENTS

| | | | |
|---|---|---|---|
| 4,742,512 A | 5/1988 | Akashi et al. .................. 370/96 |
| 4,774,707 A | 9/1988 | Raychaudhuri ................ 370/95 |
| 5,410,538 A * | 4/1995 | Roche et al. ................. 370/479 |
| 5,422,887 A | 6/1995 | Diepstraten et al. ........ 370/85.3 |
| 5,590,131 A | 12/1996 | Kabatepe ..................... 370/461 |
| 5,657,326 A | 8/1997 | Burns et al. .................. 370/349 |
| 5,889,963 A | 3/1999 | Gopal et al. ............ 395/200.58 |
| 5,892,759 A | 4/1999 | Taketsugu .................... 370/349 |
| 5,940,400 A | 8/1999 | Eastmond et al. ........... 370/445 |
| 5,987,033 A | 11/1999 | Boer et al. ................... 370/445 |
| 6,005,853 A | 12/1999 | Wang et al. .................. 370/332 |
| 6,006,271 A | 12/1999 | Grabiec et al. .............. 709/235 |
| 6,009,468 A | 12/1999 | Lau et al. .................... 709/225 |
| 6,052,594 A * | 4/2000 | Chuang et al. .............. 455/450 |
| 6,192,026 B1 * | 2/2001 | Pollack et al. ............... 370/203 |
| 6,333,937 B1 * | 12/2001 | Ryan ............................ 370/468 |
| 6,469,997 B1 * | 10/2002 | Dorenbosch et al. ........ 370/337 |
| 6,473,418 B1 * | 10/2002 | Laroia et al. ................ 370/344 |
| 6,600,776 B1 * | 7/2003 | Alamouti et al. ............ 375/147 |

FOREIGN PATENT DOCUMENTS

| | | |
|---|---|---|
| CA | 2209400 A1 | 1/1998 |
| EP | 0874494 | 10/1998 |
| JP | 2000115182 | 4/2000 |
| WO | WO 9825415 | 6/1998 |
| WO | WO 9945672 | 9/1999 |

OTHER PUBLICATIONS

Cimini et al, Advanced Cellular Internet Service (ACIS), IEEE, pp. 150-159, 1998.*

* cited by examiner

Primary Examiner—Frank Duong
(74) Attorney, Agent, or Firm—Perkins Coie LLP

(57) ABSTRACT

A method is provided for multiple remote units (RU)s to efficiently utilize resources on a shared OFDM high speed data channel without collisions. A collision occurs when two or more RUs transmit on the same frequency at the same time. The method defines two distinct states for accessing the channel. These are the Arbitration state and the Data Transfer state. A base station transmits a flag on the downlink to notify the RUs of which state is in effect. RUs having a data message notify the base station by transmitting a frequency tone, which acts as a request to transmit data, during the arbitration state. The tone frequencies are frequency spaced to be mutually orthogonal, so that the base station can receive all the uplink requests simultaneously. Upon receiving the uplink request signals, the base station establishes the data transfer state and orders the uplink data messages from the remote units is a non-interfering sequence. A system for preventing uplink data message collisions in an OFDM communications system is also provided.

35 Claims, 8 Drawing Sheets

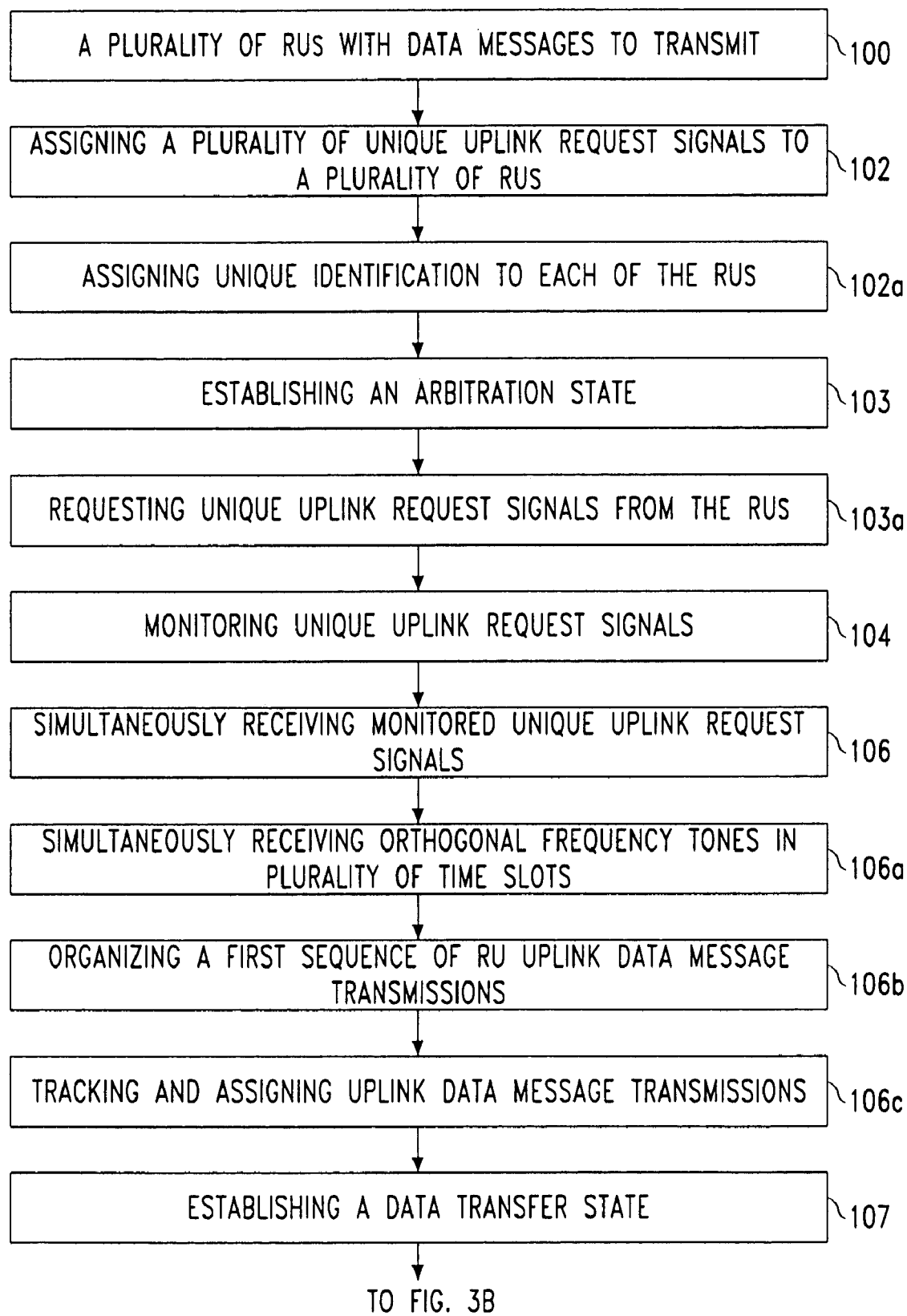

COLLISION-FREE MULTIPLE ACCESS RESERVATION SCHEME FOR MULTI-TONE MODULATION LINKS

RELATED APPLICATION

This application claims the benefit of U.S. Provisional Application No. 60/172,417, filed Dec. 17, 1999 and entitled "Collision-Free Multiple Access Packet Data Scheme For Multi-Tone Modulation Links (eg. OFDM)," which is incorporated herein in its entirety.

BACKGROUND OF THE INVENTION

This invention relates generally to communication systems and, more particularly, to a system and method for efficiently transmitting and receiving messages in a multiple access communications network without collisions.

In communication systems, a channel, defined as a bandwidth of frequency in a frequency division system or a time slot in a time division system, is considered a fixed communication resource. To improve communication efficiencies, several remote units in the system must typically share the fixed resource. That is, the remote units must all use the same channel. The term multiple access refers to the sharing of a fixed communication resource. Multiple Access Control (MAC) protocols can be divided into two broad categories—fixed assignment and random access. Random access protocols can be further divided into pure random access and controlled random access.

Fixed assignment MAC protocols are typically used when a continuous stream of data is to be transmitted. Examples of such data are digitized voice traffic, video transmission and facsimile transmission. The most common fixed assignment methods include Frequency Division Multiple Access (FDMA), in which sub-bands of frequency are specified; Time Division Multiple Access (TDMA), in which periodic time slots are specified; and Code Division Multiple Access (CDMA), in which a set of orthogonal spread spectrum codes are specified.

If the information is to be transmitted as intermittent or bursty data messages, fixed assignment methods can result in communication resources being wasted much of the time. Random access MAC protocols provide a more flexible and efficient way of managing channel access for communication of short data messages. Commonly used random access schemes include the pure ALOHA protocol, the slotted-ALOHA protocol, Carrier Sense Multiple Access with Collision Detection (CSMA/CD) and Data Sense Multiple Access with Collision Detection (DSMA/CD). Controlled random access methods include Reservation Aloha, Polling and Token passing schemes.

The fundamental characteristic of random access MAC protocols that limits their achievable throughput is the high incidence of packet collisions under heavy loads of offered data message traffic. A collision is considered to have occurred when two or more users attempt to access the channel simultaneously. During a collision the channel resources are, in effect, wasted. The maximum achievable throughput for the slotted ALOHA protocol is only about 37% and that of DSMA/CD is about 50%. Controlled random access protocols exercise more control over the access method and as a result avoid some of the inefficiencies of the pure random access schemes.

An exemplary prior art multiple access system is presented below to demonstrate some of the key issues addressed by the present invention collision avoidance system. The prior art DSMA/CD system is loosely based on the DSMA/CD scheme by CDPD (cellular digital packet data). The DSMA/CD system consists of a base station and a number of remote units. The base station receives data messages from the remote units on one shared channel. The base station transmits information about the shared channel to the remote units on a different channel. The remote units can only listen to the channel on which the base transmits. They cannot listen to the channel on which they themselves transmit. The information transmitted by the base station consists of two bits of information. The Busy/Idle bit informs the remote units if the shared channel is in use by one of the remote units already. The Decode Status bit informs the remote unit if a data message, transmitted on the shared channel, has been successfully received by a base station. The process of accessing the channel by the remote units is known as arbitration.

If a remote unit has a data message to transmit, it looks at the Busy/Idle bit it receives from the base station. If the shared channel is busy, then the remote unit waits until the received Busy/Idle bit indicates that the shared channel is idle. Once the shared channel is idle, the remote unit can begin its transmission of the data message on the channel. It continues to sense the Busy/Idle bit after it has begun its transmission. If the remote unit is the only one that has accessed the channel, then the Busy/Idle bit will be set to busy after the duration of a round-trip delay between the base station and the remote unit. This round-trip delay includes the propagation time for the transmissions between the remote station and the base unit, as well as any processing of the data by the base station and the remote unit.

If the base station successfully receives the data message transmissions from the remote unit, then it indicates that the remote unit has successfully accessed the channel by setting the Busy/Idle flag to busy. The remote unit will see the busy indication after a round-trip delay and will continue data message transmission until it is done. The maximum amount of time the remote unit is allowed to transmit is usually fixed as a system design parameter.

If, however, a second remote unit has a data message to transmit at the same time as the first remote unit, then it too will see that the channel is idle, and it too will begin to transmit its data message. In this case, the base station will receive a signal that consists of the superposition of the transmitted data messages from both remote units. The base station detects that more than one remote unit is transmitting simultaneously and in this case keeps the Busy/Idle bit at idle. Both remote units will see the idle indication after a round-trip delay. The fact that the channel has remained idle indicates to both units that they have not successfully accessed the channel and so they cease transmissions immediately. They both delay a random amount of time before attempting to access the channel again. This delay is known as a backoff. The remote units will continue to attempt to transmit their data messages until the data message is successfully transmitted or until the maximum number of allowable backoffs has been reached. If the maximum number of backoffs has been reached, then the data message is simply discarded.

There are many parameters that can be adjusted in the prior art scheme in order to improve the overall performance of the DSMA/CD algorithm. These parameters include the number of backoffs, the size of backoffs, etc. The results shown here are based on the best case performance that has been achieved for the DSMA/CD algorithm. The backoff scheme used is known as exponential backoff, where the amount of time spent waiting between access attempts is randomly chosen between zero and an exponential function of the number of backoffs.

The uplink utilization does not change appreciably as the number of remote units is increased from 5 to 30, as shown in Table 1. However, the utilization is relatively low, at approximately 54%.

Table 1 illustrates the uplink utilization vs. the number of active remote units in a heavily loaded system.

TABLE 1

Uplink Utilization vs. Number of active remote units

| Number of RUs | Uplink Utilization | % Discarded |
|---|---|---|
| 5 | 54.1% | .4% |
| 10 | 54.6% | 1.4% |
| 15 | 54.2% | 3.1% |
| 20 | 53.4% | 4.8% |

The uplink utilization does not present the total picture however. The number of discarded frames as a function of the number of remote units must also be examined. In Table 1 it can be seen that the number of discarded frames increases approximately linearly with the number of active RUs on the system. The only way to bring down the number of discards is by increasing the maximum allowable number of backoffs or by increasing the size of the backoffs. However, doing so decreases the latency and throughput for smaller numbers of remote units. The utilization with the DSMA/CD algorithm is at best ~55%. This means that 45% of the shared channel capacity is being lost.

After a remote unit has finished its data message transmissions, it must attempt once again to gain access to the shared channel. The duration of the access attempt is non-deterministic due to the possibility of collisions on the uplink. The DSMA/CD algorithm toggles between the arbitration period and channel-seized period for each remote unit that wants to access the uplink, which is an inefficient use of the shared channel.

With DSMA/CD the number of frames discarded is a function of the number of active remote units on the system and the maximum number of backoffs. Increasing the maximum number of backoffs reduces the percentage of discarded frames. However, this can lead to an 'unfair' sharing of the uplink in the short term. The backoff period increases exponentially with the number of backoffs. While remote unit #1 is backing off multiple times, remote unit #2 may be grabbing the channel between backoffs, in effect blocking remote unit #1 from ever gaining access to the shared channel. Also, multiple backoffs by the MAC layer may lead to backoffs by the upper layers (e.g., FTP), which further exaggerates the unfair sharing of uplink resources.

It would be advantageous if the amount of time spent in arbitration for an uplink channel could be minimized and the amount of time spent transmitting data messages could be maximized.

It would be advantageous if a scheme could be developed that permitted multiple RUs to arbitrate simultaneously, and then be granted an access channel without further arbitration.

It would be advantageous if all RUs had equal access to complete their data message transmissions.

It would be advantageous if a multiple access scheme could be developed which avoided the problem of discarded frames and permitted a more 'fair' sharing of the uplink.

SUMMARY OF THE INVENTION

Accordingly, a method for receiving messages from a plurality of remote units without collisions has been provided. The method comprises: assigning unique uplink request signals to a plurality of remote units, including a first unique uplink signal to a first remote unit and a second unique uplink request signal to a second remote unit; monitoring the unique uplink request signals; simultaneously receiving monitored unique uplink request signals, including the first and second unique uplink request signals; and in response to receiving the first and second unique uplink request signals, authorizing the transmission of uplink data messages from the first and second remote units. The presence of a remote unit's unique uplink request signal indicates that the remote unit has a data message for transmission uplink. The absence of the unique uplink request signal indicates that the remote unit has no data message for transmission uplink.

The assignment of a unique uplink request signal includes assigning a frequency tone to each of the plurality of remote units. To insure that multiple tones can be received without mutual interference, the assigned frequency tones are separated to be orthogonal to one another with respect to frequency. Further, temporal orthogonality is also used, as remote units transmit their tone frequencies in different time slots.

The method further comprises establishing an arbitration state, the establishment of the arbitration state including soliciting the unique uplink request signals from the first plurality of remote units and, in response to soliciting the unique uplink request signals, monitoring the unique uplink request signals for a response.

The method further comprises: establishing a data transfer state including organizing a first sequence of remote unit uplink data message transmissions; sending instructions to the first and second remote units for transmitting uplink data messages in the first sequence; and receiving the uplink data messages from the first and second remote units in the first sequence.

A communication system for receiving uplink data messages without collisions is also provided. The system comprises a base station which establishes an arbitration state to request unique uplink request signals, and which monitors unique uplink request signals. A first remote transmits a first unique uplink request signal to the base station in response to receiving the request for unique uplink request signals, and a second remote unit transmits a second unique uplink signal to the base station in response to receiving the request for unique uplink request signals. The base station monitors unique uplink request signals received simultaneously from the first and second remote units.

In response to receiving the first and second unique uplink request signals, the base station establishes a data transfer state to receive the uplink data messages from the first and second remote units in a non-interfering sequence. Then, the first and second remote units transmit uplink data messages in response to the uplink instruction from the base station.

As described above, the unique uplink request signal of the remote units includes an orthogonal frequency tone, or a unique time slot. In some aspects of the invention, the unique signal includes a time slot assignment in addition to the frequency tone, so that multiple remote units can use the same tone (at different times). Alternately, the unique uplink request signal is an orthogonal spreading code, or a combination of spreading code with orthogonal elements of frequency and time.

BRIEF DESCRIPTION OF THE DRAWINGS

FIGS. 3a and 3b are a flowchart illustrating a method for receiving data messages at a base station without collisions.

DETAILED DESCRIPTION OF THE PREFERRED EMBODIMENT

Figure 1:
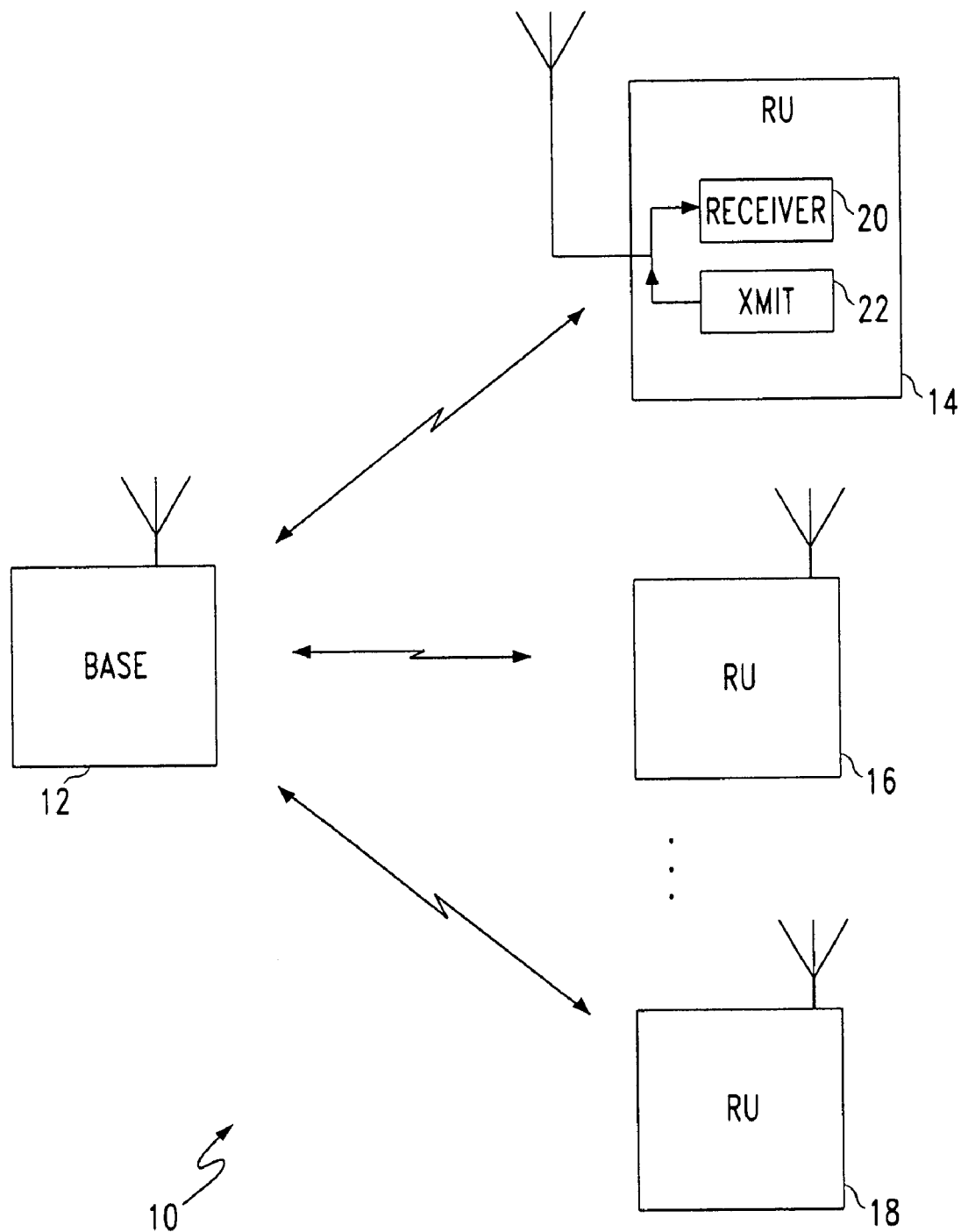
FIG. 1 is a block diagram schematic illustrating the present invention communication system for receiving uplink data messages without collisions.

FIG. 1 is a block diagram schematic illustrating the present invention communication system for receiving uplink data messages without collisions. The system 10 comprises a base station 12 having a port to transmit and receive messages. The base station 12 establishes an arbitration state to request unique uplink request signals and to monitor unique uplink request signals.

A first remote unit 14 has a port in communication with the base station 12 to transmit and receive messages. The first remote unit 14 transmits a first unique uplink request signal to the base station in response to receiving the request for unique uplink request signals. The remote unit 14 sends a signal which is typically a single bit of information using on/off decoding. A second RU 16 has a port in communication with the base station 12 to transmit and receive messages. The second RU 16 transmits a second unique uplink request signal to the base station 12 in response to receiving the request for unique uplink request signals. The base station 12 monitors unique uplink request signals received simultaneously from the first and second RUs 14 and 16.

Although the figure shows a wireless communication system, the present invention system is also applicable to systems using hardwired cable or fiber channel connections, such as cable modems, Internet applications, and cable TV. This invention, however connected, describes a method for multiple remote units (RUs) to efficiently utilize resources on a shared OFDM channel without collisions. A collision occurs when two or more RUs, for example RU 14 and 16, transmit on the same frequency at the same time. There are two distinct states defined for accessing the channel. These are the arbitration state and the data transfer state. The base station 12 notifies the RUs 14 and 16 which state is in effect by transmitting a flag on the downlink.

In response to receiving the first and second unique uplink request signals from the first and second RUs 14 and 16, the base station 12 establishes a data transfer state to receive the uplink data messages from the first and second remote units 14 and 16 in a non-interfering sequence. Then, the first and second RUs 14 and 16 transmit uplink data messages in response to the uplink instruction from the base station 12.

Typically, the system 10 comprises a plurality of remote units, including the first 14, second 16, and nth 18 remote units, where n can be any number. Each of the plurality of RUs 14–18 communicate with the base station 12 to receive requests for unique uplink request signals. Each one of the plurality of remote units 14–18 transmits a unique uplink request signal which represents a data message ready for transmission uplink, and each one of the plurality of remote units 14–18 receives uplink data message instructions from the base station 12 in response to transmitting its unique uplink request signal.

Each RU, as represented by first RU 14, comprises a receiver 20 having an input to accept solicitations for uplink request signals transmitted by the base station 12. A transmitter 22 has an output to provide a first frequency tone, selected from a plurality of orthogonal frequency tones, which uniquely identifies the remote unit. The transmitter 20 sends the first frequency tone to the base station 12 in response to the solicitation of unique uplink request signals, to indicate the existence of a data message for transmission uplink.

In the present invention collision-free scheme, the uniqueness of the uplink request signals is established through the use of orthogonal signal components. Orthogonality can be achieved in the time (TDMA), frequency (FDMA), code (CDMA) and space (SDMA) domains.

The unique uplink request signal of each of the plurality of remote units 14–18 includes a frequency tone selected from a plurality of unique frequency tones, where each of the plurality of frequency tones is orthogonal to the others. The RUs 14–18 are assigned an Arbitration Group ID Number (AGN) and a set of tones (normally a single tone) for use during the arbitration state. During this state, the base station 12 transmits an AGN on the downlink. If an RU has a data message to transmit, and its AGN matches that transmitted by the base 12, then it energizes the tones that have been assigned to it. The AGN and tone assignments are made in such a way that no two RUs in an arbitration group are assigned the same tone. Thus, multiple RUs 14–18 can arbitrate simultaneously.

In some aspects of the invention, steps are taken to prevent "cresting", or an impulse spike occurring in the time domain which results from the plurality of frequency tones arriving at the base station 12 at the same time, and in phase. Therefore, unique uplink request signals from the first plurality of remote units 14–18 include the simultaneous, or near simultaneous, transmission of frequency tones from the plurality of frequency tones, having a random phase relationship to one another.

In some aspects of the system, the unique uplink request signals of each of the plurality of remote units 14–18 are orthogonal in time, as each RU 14–18 is assigned a unique time slot selected from a plurality of time slots. In other aspects, the unique uplink request signal incorporates elements of orthogonal time and frequency, so that the combination of a particular frequency tone and time slot forms a unique uplink request signal for each remote unit. Likewise, the unique uplink request signal of each of the plurality of remote units 14–18 are orthogonal with respect to code, as each RU 14–18 is assigned a unique spreading code selected from a plurality of orthogonal spreading codes. In other aspects, the unique uplink request signal incorporates elements of orthogonal code and frequency, code and time, and code, frequency and time, so that the combination of elements forms a unique uplink request signal for each remote unit.

Figure 2:
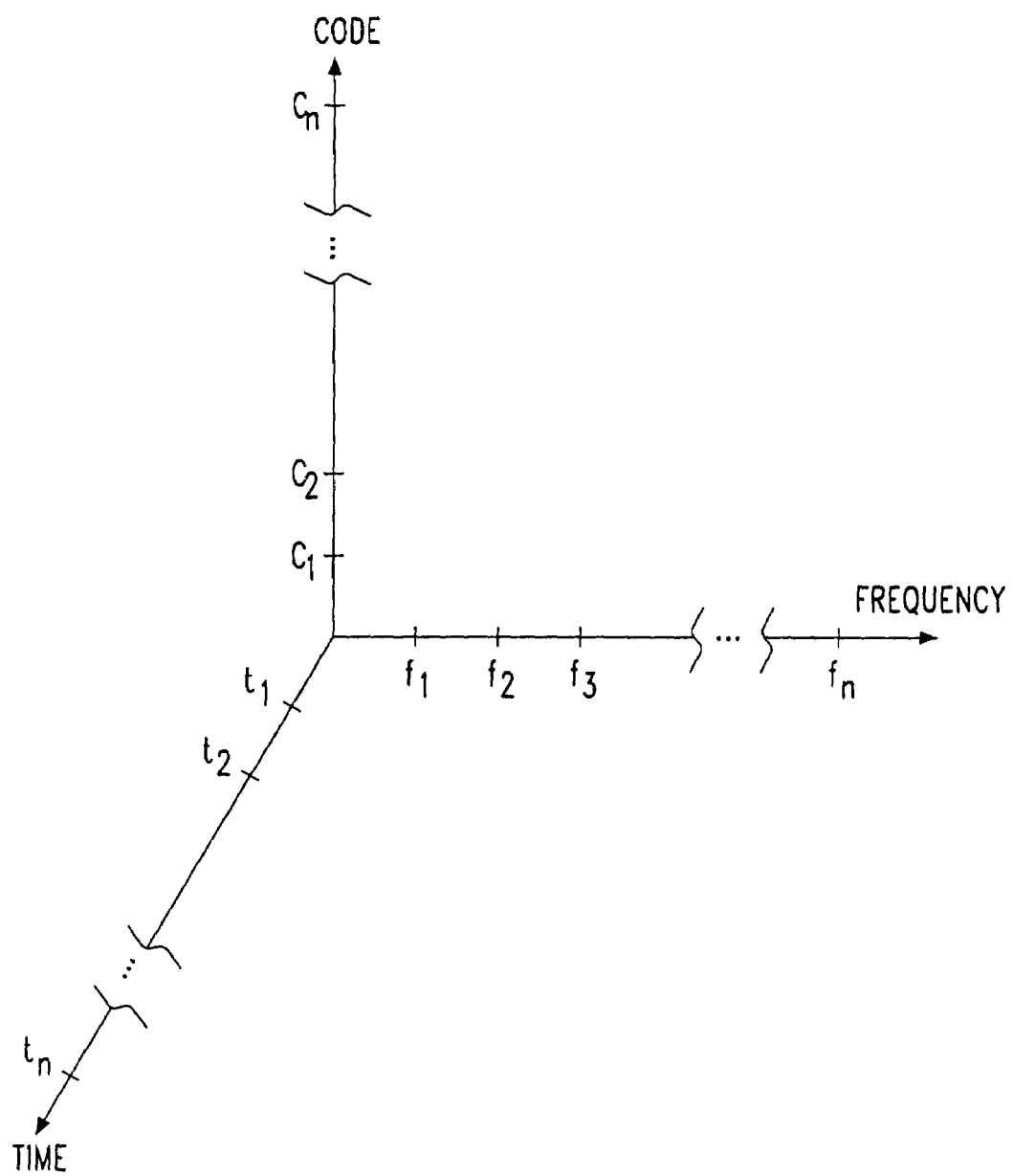
FIG. 2 illustrates the orthogonal components of unique uplink request signals.

FIG. 2 illustrates the orthogonal components of unique request signals. A plurality of frequencies, $f_1$ through $f_n$, are represented. Due to the spacing between the frequencies, they can be received in a wideband receiver without the effects of mutual interference. Thus, the signals of n RUs can be received simultaneously. Likewise, the airlink can be sampled at distinct times, represented by times $t_1$ through $t_n$. Further, the airlink can be sampled with respect to distinct spreading codes, represented by codes $c_1$ through $c_n$. In any one dimension, a total of n unique signals can be received. Combining two dimensions, time and frequency for example, a total of n×n uplink message signals can be received at the base state without interference. Combining three dimensions, a total of (n×n×n) unique uplink signals can be created.

Returning to FIG. 1, the assignment of the tones and timeslots for arbitration occurs when an RU makes an open request to the base station 12. The base station 12, through a management entity, assigns the tone and timeslot. For simplicity, it will be assumed herein that the base station 12 performs all the centralized network functions.

The base station 12 maintains a list of all active RU IDs and the tone/timeslot pairs that are assigned to them. In an exemplary OFDM communications system, the basic unit of transmission in the uplink is a Quad of 72 tones (18 tones×2 frequency slots×2 TDMA slots). Therefore, up to 72 RUs can be assigned a unique OFDM tone in a given Quad to arbitrate for the uplink data channel.

In the collision-free scheme described so far, only a single tone is assigned to each RU. However, more than one tone can be assigned to each RU to communicate the one-bit uplink request representing the existence of an uplink data message ready for transmission when channel conditions are poor. This, of course, may result in extending the amount of time spent in the arbitration state, as more AGNs may be required.

If more than 72 RUs are assigned to a sector, then each group of 72 RUs needs to be assigned to a different Quad. The Quads during arbitration are each given an Arbitration Group Number (AGN). The AGNs range from 0 to floor ((numRUs-1)/72), where the "floor" is the integer part of a number, and numRUs is the number of RUs in the system. The base transmits the current AGN to all the RUs.

The base 12 measures the power in the tones it receives from the RUs 14–18. If the base 12 detects energy above a threshold in some or all of the tones assigned to an RU, then it is determined that the RU corresponding to the assigned tone has data to transmit. The threshold can be determined by measuring the noise floor, and setting the threshold to a certain level above the noise floor. In the exemplary OFDM system, certain tone frequencies are reserved for this purpose. No RUs are permitted to transmit at the reserved frequencies.

In an exemplary OFDM system, the smallest unit of time available is a time slot (375 microsecond) and the smallest unit of bandwidth is an OFDM tone. Thus, if the goal in the arbitration state is for the RU to signal the base station that it desires to use the uplink data channel for the transmission of a data message, an OFDM tone in a single (375 microsecond) timeslot is sufficient to make the request.

The minimum length of the arbitration state is determined by the amount of delay in the OFDM system. In the exemplary OFDM system, there is a 6 ms round-trip delay from when the RU sends a message to the base until it receives a reply to that message. Therefore, the minimum length of the arbitration state is 4 Quads (2 Quads are assigned to the uplink in every 3 ms TDMA frame). Note that an RU may transmit its arbitration tone more than once during an arbitration state, especially if the total number of AGNs is less than 4.

Alternatively, a first RU may not get to transmit its arbitration tone during a given arbitration state if there are more AGNs than the minimum length of the arbitration state and a second RU has transmitted an arbitration tone earlier, thus preventing the AGN assigned to RUx from occurring during a given arbitration state. In order to allow 'fair' access to the uplink, the AGN at the start of the next arbitration state continues from the AGN transmitted at the end of the previous arbitration sequence.

The arbitration state remains in effect until the base 12 detects an RU, or RUs that have data messages to be transmitted. The base 12 determines which RUs have data messages to transmit from the energy measurements on the unique uplink request tones during the arbitration state. There are no predefined timeslots set aside for the arbitration state only, or for the transmission state only.

Once the base 12 detects that some RUs have data messages to send, it switches to the data transfer state. The base station organizes a sequence of uplink data messages for transmission uplink. The base station 12 now sends in the downlink, either the RU ID or the Arbitration Group Number/Tone Number of the RU that is granted access to the uplink for the transmission of the data message, first RU 14 for example. Each of the first plurality of remote units 14–18 has a unique identifier, and the base station 12 uses the remote unit unique identifiers in transmissions to provide uplink data message sequence instructions to the remote units. The unique identification for each of the first plurality of remote units 14–18 can be a remote unit identification number. In addition, since the uplink request signals of each RU are unique—for example, a frequency/time slot combination—the RU identification can be based on each remote unit having a unique uplink request signal, such as the unique combination of frequency tones and time slots.

From the arbitration state, the base knows which RUs desire to transmit data messages uplink. The base can then allow uplink access to all of the RUs that requested it by sequentially stepping through the list of requesting RUs. The base can either send the RU ID of the RU that is next, or the Arbitration Slot Number/Tone number pair of that RU.

Each of the RUs 14–18 receive the RU ID/AGN+Tone number, but only the RU with the matching identification, the first RU 14 for example, can now transmit a data message uplink. The first RU 14 transmits its data message to the base station 12. Once the base station 12 receives all the data from the first RU 14, it orders the next RU from which it received a unique uplink request signal during the arbitration period, the second RU 16 for example, to send its data message.

An RU continues transmission of its data message until it either runs out of data to transmit, or it has transmitted the maximum amount of data allowed after a successful arbitration. With respect to the exemplary system, this may be any number of protocol data units (PDUs). Alternatively, the base 12 may allow an RU to transmit a variable number of PDUs, based on the number of RUs that indicated they have a data message to transmit during the arbitration period. For example, if only a single RU has data to send, then the base station 12 may allow it to send up to ten PDUs. If four or five RUs have data to send then the base station 12 may allow them to transmit only two or three PDUs each.

The data transfer state remains in effect until all RUs have completed transmitting their data messages. Once all the data messages has been received, the base station 12 reverts back to the arbitration state.

The base station 12 decodes each received PDU and transmits a decode status indicating whether the PDU has been successfully decoded. In this manner, the RUs can determine if their transmitted data message was successfully received and decoded. In subsequent requests for PDUs made by the base station 12, the remote units 14–18 repeat unique uplink request signals to retransmit unsuccessfully decoded uplink messages. The base station 12 monitors the unique uplink request signals requesting permission to retransmit uplink messages from remote units 14–18. In this manner, the remote units with unsuccessfully decoded uplink messages request another opportunity to uplink. Simultaneously, other remote units with new, or first-time, data messages for transmission uplink may also request service. The base station 12 receives unique uplink request signals from both groups of remote units and orders an uplink data message sequence which includes initial and repeat uplink data messages.

Figure 3B:
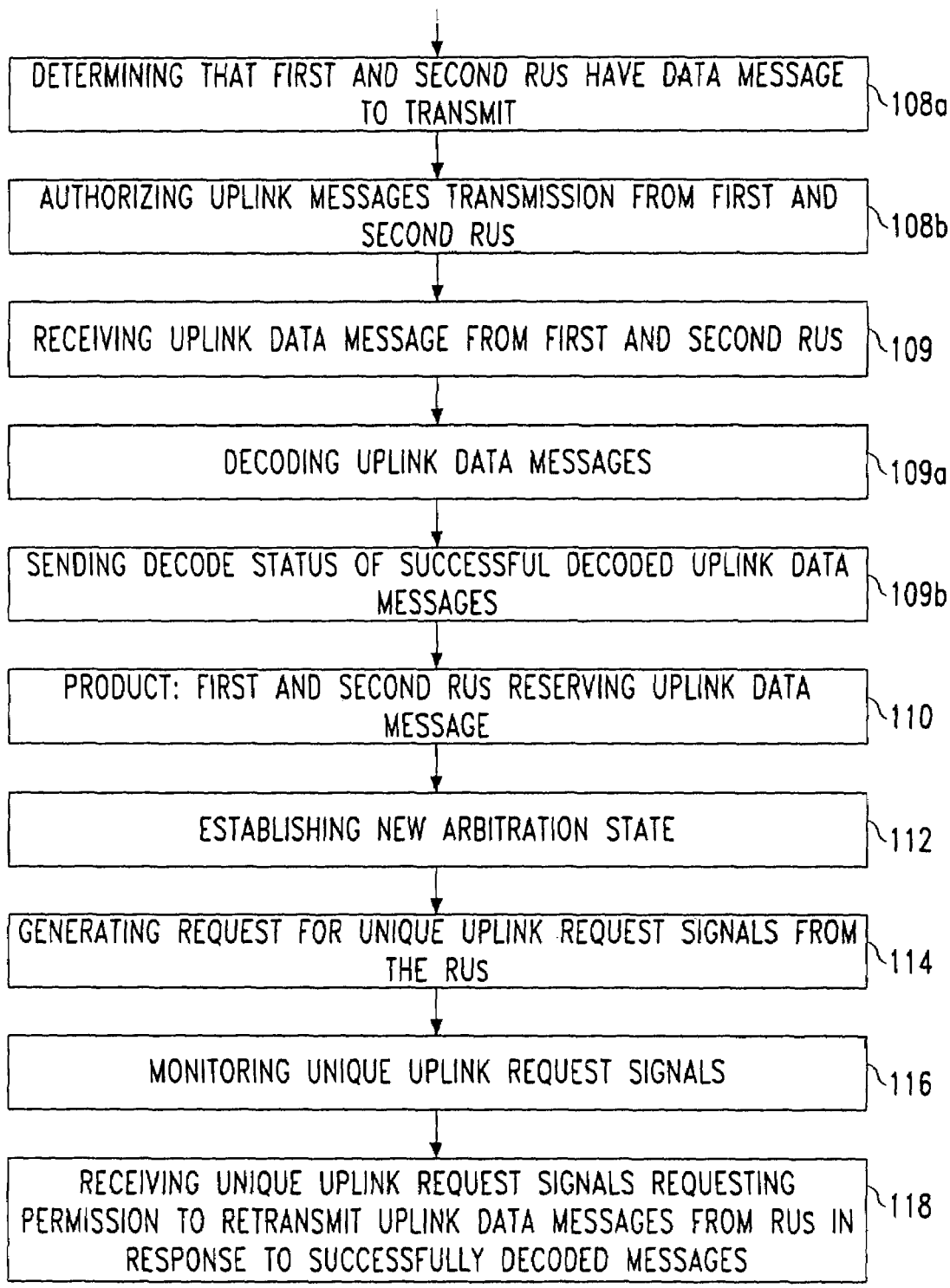

FIGS. 3*a* and 3*b* are a flowchart illustrating a method for receiving data messages at a base station without collisions. Although the process is depicted as a series of numbered steps for the purpose of clarity in the explanation, no order should be inferred from this numbering unless explicitly stated. Step 100 begins the method with a plurality of RUs. Step 102 assigns a plurality of unique uplink request signals to a plurality of remote units, including a first uplink request signal to a first remote unit and a second uplink request signal to a second remote unit. Step 104 monitors the plurality of unique uplink request signals. Step 106 simultaneously receives monitored unique uplink request signals, including the first and second unique uplink signals. Step 108*a*, in response to receiving the first and second unique uplink request signals, determines that the first and second remote units have data messages to transmit uplink. Step 108*b* authorizes the transmission of uplink data messages from the first and second remote units to the base station. Step 110 is a product where the first and second remote units have reserved uplink data message transmission assignments without collisions.

In Step 100 the method includes a plurality of frequency tones. The assignment of a unique uplink request signal in step 102 includes assigning a frequency tone from the plurality of frequency tones to each of the plurality of remote units. The assignment of frequency tones from the plurality of frequency tones to the plurality of remote units includes the plurality of frequency tones being orthogonal to one another. Then, the simultaneous reception of the monitored unique uplink request signals in step 106 includes simultaneously receiving orthogonal frequency tones. In some aspects of the invention, the simultaneous reception of the monitored unique uplink request signals includes transmitting frequency tones from the plurality of frequency tones having a random phase relationship to one another. In other aspects of the invention the assignment of frequency tones from the plurality of frequency tones to the plurality of remote units in step 102 includes assigning two tones from the plurality of frequency tones to each remote unit from the plurality of remote units. Two, or more, frequency tones are used when there is an increased probability of channel degradation.

In some aspects of the method step 100 includes a plurality of time slots, and the assignment of a unique uplink request signal in step 102 includes assigning a time slot from the plurality of time slots to each of the plurality of remote units. In some aspects of the invention, the assignment of a unique uplink request signal includes the unique uplink request signals having both orthogonal frequencies and orthogonal time slots. Then, a further step, step 106*a*, simultaneously receives orthogonal frequency tones in a plurality of time slots. In another aspect of the invention, step 102 includes the unique uplink request signals being orthogonal spreading codes.

The method further comprises a step, step 103, of establishing an arbitration state. The establishment of the arbitration state includes a sub-step, step 103*a*, of requesting unique uplink request signals from the plurality of remote units. Typically, the requesting of unique uplink request signals includes transmitting an arbitration state signal to the plurality of remote units. Then, in response to the request for unique uplink request signals, step 104 monitors the plurality of unique uplink request signals for a response.

Step 107 establishes a data transfer state. Step 108 includes sending instructions to the first and second remote units for transmitting uplink data messages. The sending of instructions to the first and second remote unit for the transmission of uplink data messages includes transmitting a data transfer signal to the first and second remote units. Step 109 receives the uplink data messages from the first and second remote units.

Alternately stated, the present method establishes a reservation channel in step 103 and a data channel in Step 107, where the reservation and data channels are shared.

Following the reception of the monitored unique uplink request signals in step 106, and preceding the establishment of the data transfer state in step 107, step 106*b* organizes a first sequence of remote unit uplink data message transmissions. The sending of instructions for the transmission of uplink data messages in step 108 includes granting permission to transmit uplink data messages in the first sequence, and the reception of the uplink data messages in step 109 includes receiving uplink data messages in the first sequence.

The establishment of the data transfer state includes further steps. Step 109*a* decodes the data uplink messages. Step 109*b* sends decode status messages indicating whether the uplinked messages have been successfully decoded. Following the data transfer state, step 112 establishes a new arbitration state. Step 114 generates another request by the base station for unique uplink request signals from the first plurality of remote units. Step 116 monitors the first plurality of unique uplink request signals and step 118, in response to sending unsuccessful decode messages in step 109*b*, receives signals requesting permission to retransmit uplink data messages from the remote units. The uplink data messages that were unsuccessfully decoded are retransmitted in a sequence with initial (first-time) uplink data messages, if any exist.

Some aspects of the invention include further steps. Step 102*a* assigns a unique identification to each of the first plurality of remote units. Step 106*c* tracks unique uplink request signals and assigns the uplink data message a position in a sequence using the remote unit unique identification. The assignment of a unique identification to each remote unit in step 102*a* includes selecting an identification scheme from the group including remote unit identification numbers and an identification based on each remote unit having a unique combination of frequency tones and time slots.

Figure 4:
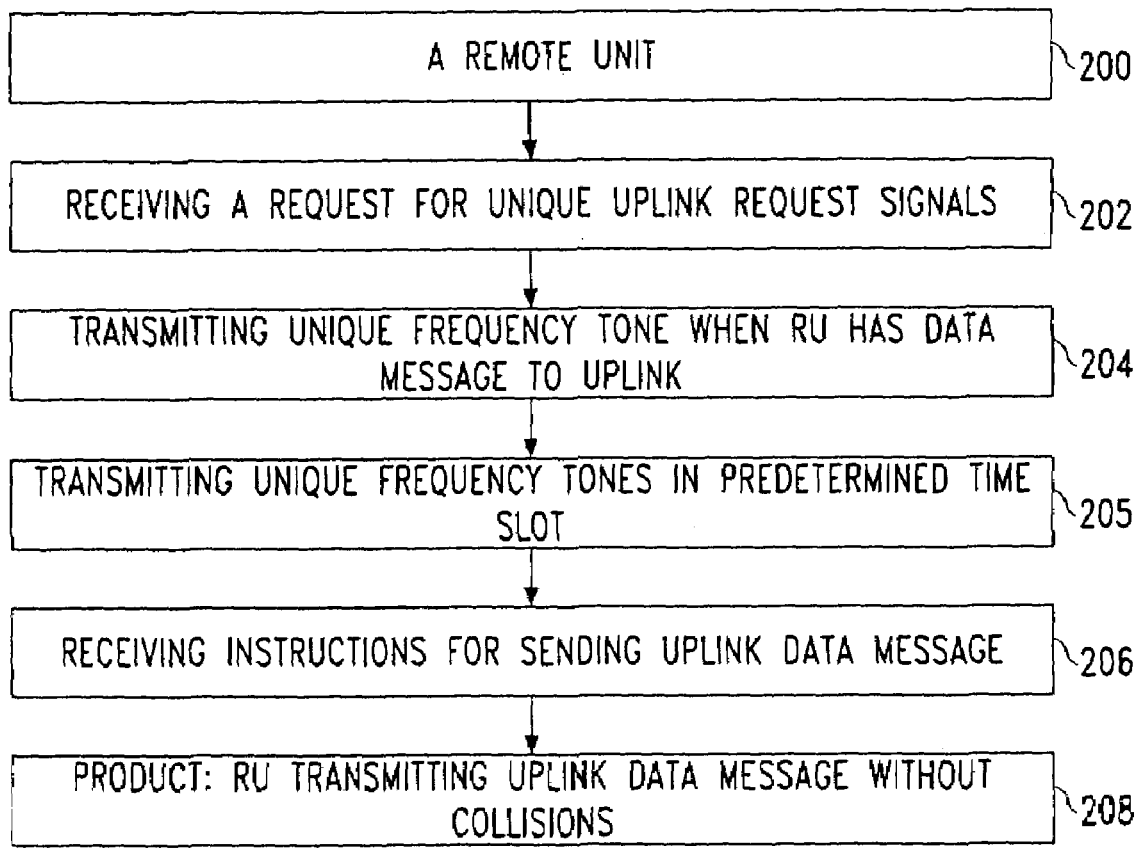
FIG. 4 is a flowchart illustrating a method to uplink data messages to a base station without collisions.

FIG. 4 is a flowchart illustrating a method to uplink messages to a base station without collisions. In step 200 the method begins with a remote unit. Step 202 receives a request for unique uplink request signals. Step 204, in response to the request for unique uplink request signals, transmits a unique frequency tone when the remote unit has a uplink data message for transmission. In some aspects of the invention step 205, in response to the request for unique uplink request signals, transmits the unique frequency tones in a predetermined time slot. Step 206, in response to transmitting the unique frequency tone, receives instructions for sending the uplink data message. Step 208 is a product where a remote unit transmits an uplink data message channel without collisions.

Figure 5:
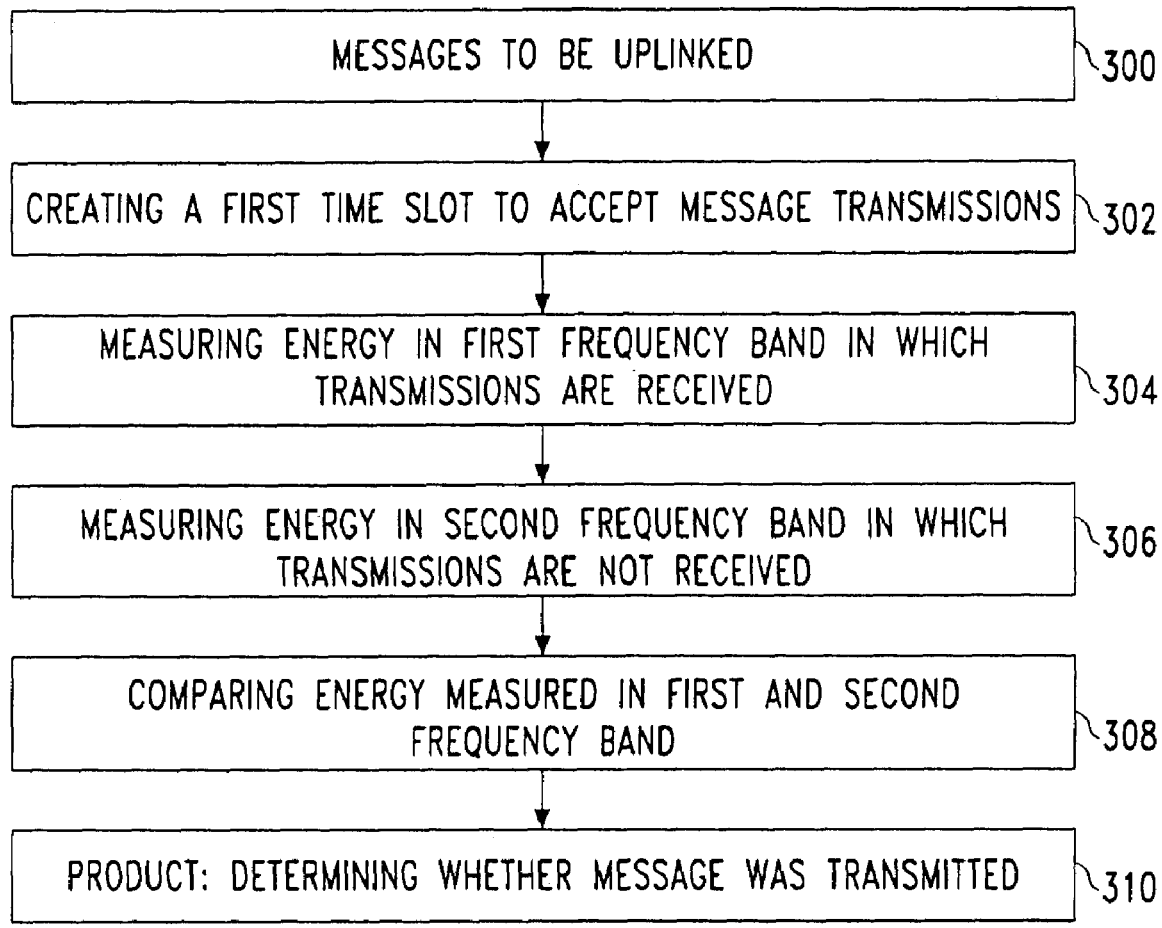
FIG. 5 is a flowchart illustrating a method for communicating.

FIG. 5 is a flowchart illustrating a method for communicating. In step 300 the method begins with messages to be uplinked. Step 302 creates a first time slot to accept signal transmissions. Step 304 measures the energy in a first frequency band in which transmissions are received. Step 306 measures the energy in a second frequency band in which transmissions are not received. Step 308 compares the energy measured in the first and second frequency band. Step 310 is a product where, in response to the comparisons made in Step 308, a determination is made as to whether a signal has been transmitted.

Figure 6:
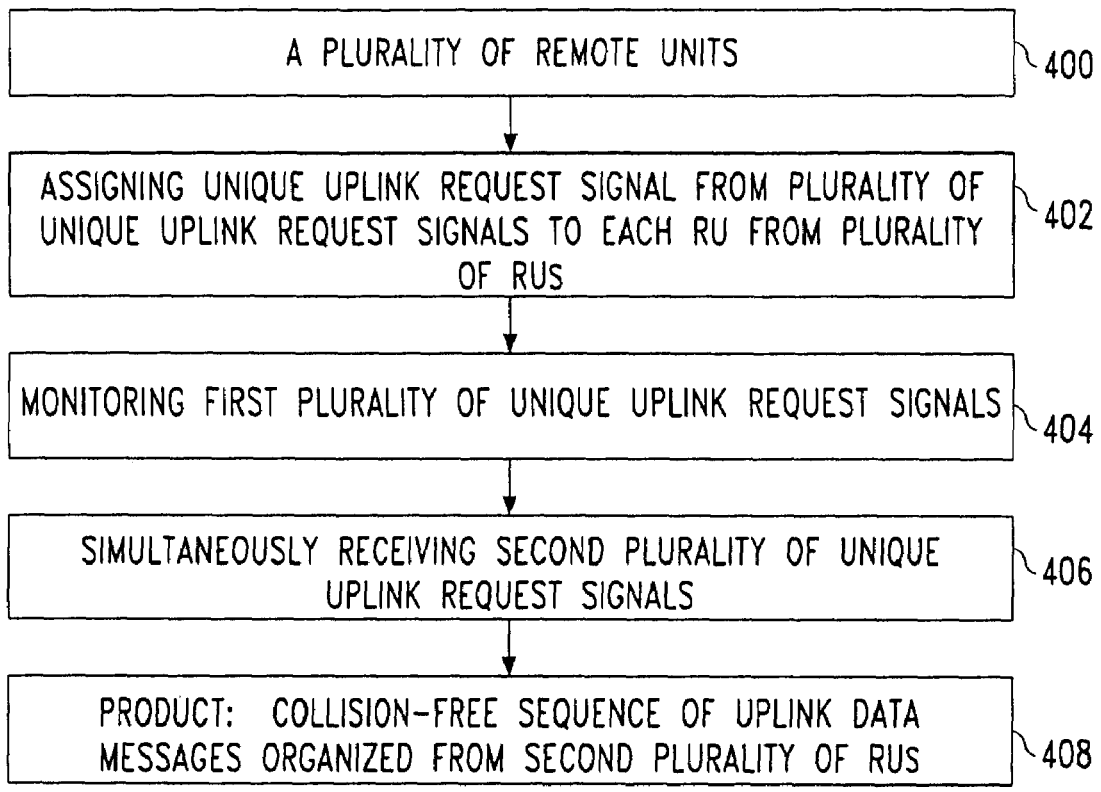
FIG. 6 is a flowchart illustrating a method for receiving data messages in a collision-free sequence.

FIG. 6 is a flowchart illustrating a method for receiving data messages in a collision-free sequence. Step 400 provides a plurality of remote units. Step 402 assigns a unique uplink request signal from a first plurality of signals to each remote unit from a first plurality of remote units. Step 404 monitors the first plurality of unique uplink request signals. Step 406 simultaneously receives a second plurality of unique plink request signals, from among the first plurality of assigned unique uplink request signals, which correspond to a second plurality of remote units from among the first plurality of remote units. That is, some remote units (the second plurality) from the whole group of remote units (the first plurality) respond. Step 408 is a product where, in response to receiving the second plurality of unique uplink request signals, a collision-free sequence of uplink data messages is organized from the second plurality of remote units.

Figure 7:
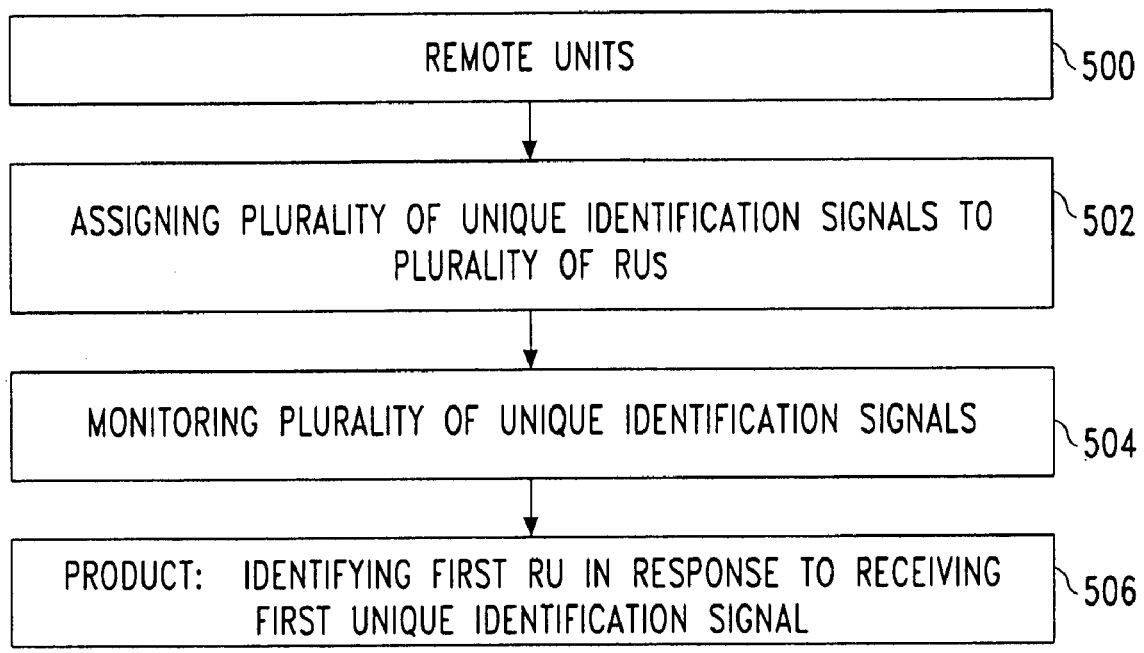
FIG. 7 is a flowchart illustrating a method for a base station to identify a remote unit.

FIG. 7 is a flowchart illustrating a method for a base station to identify a remote unit. In Step 500 the method begins with a remote unit. Step 502 assigns a plurality of unique identification signals to a plurality of remote units, including a first unique identification signal to a first remote unit. Step 504 monitors the plurality of unique identification signals. Step 506 is a product where, in response to receiving the first unique identification signal, the first remote unit is identified.

In some aspects of the method step 500 includes a plurality of frequency tones. The assignment of a unique identification signal in step 502 includes assigning a frequency tone from the plurality of frequency tones to the first remote unit. Further, the assignment of a frequency tone from the plurality of frequency tones includes the plurality of frequency tones being orthogonal to each other.

In some aspects of the method step 500 includes a plurality of time slots. Then, the assignment of a unique identification signal in step 502 includes assigning a time slot from the plurality of time slots to the first remote unit.

In the above-described exemplary OFDM system, any number of RUs may be supported, simply by incrementing the maximum AGN after every 72 RUs are installed. If RUs are removed from the system, then it may be necessary to re-assign a tone/AGN pair to other RUs to keep the maximum possible AGN to a minimum, and thus decrease latency. A simple algorithm to perform this task is to reassign an RU from the highest AGN to the AGN/tone pair of the RU that has been removed from the sector. If there are no more RUs with the maximum AGN then the maximum AGN is decremented by one.

Table 2 shows the proposed assignment of tones and timeslots in a system of 288 RUs.

TABLE 2

Assignment of Tones and Timeslots in the Collision Free Multi Access Scheme

| | Arbitration Period | | | | | | | |
| --- | --- | --- | --- | --- | --- | --- | --- | --- |
| | $t_0$ | $t_1$ | $t_2$ | $t_3$ | $t_0$ | $t_1$ | $t_2$ | $t_3$ |
| $Ru_1$ | $T_1$ | X | X | X | X | X | X | X |
| $Ru_{36}$ | $T_{36}$ | X | X | X | X | X | X | X |
| $Ru_{37}$ | X | $T_{37}$ | X | X | X | X | X | X |
| $Ru_{72}$ | X | $T_{72}$ | X | X | X | X | X | X |
| $Ru_{73}$ | $T_3$ | X | $T_{73}$ | X | X | X | X | X |
| $Ru_{108}$ | X | X | $T_{108}$ | X | X | X | X | X |
| $Ru_{109}$ | X | X | X | $T_{109}$ | X | X | X | X |
| $Ru_{144}$ | X | X | X | $T_{144}$ | X | X | X | X |
| $Ru_{145}$ | X | X | X | X | $T_{145}$ | X | X | X |
| $Ru_{180}$ | X | X | X | X | $T_{180}$ | X | X | X |
| $Ru_{181}$ | X | X | X | X | X | $T_{181}$ | X | X |
| $Ru_{216}$ | X | X | X | X | X | $T_{216}$ | X | X |
| $Ru_{217}$ | X | X | X | X | X | X | $T_{217}$ | X |
| $Ru_{252}$ | X | X | X | X | X | X | $T_{252}$ | X |
| $Ru_{253}$ | X | X | X | X | X | X | X | $T_{253}$ |
| $Ru_{288}$ | X | X | X | X | X | X | X | $T_{238}$ |
| B/A | A | A | A | A | A | A | A | A |
| A SEQ | 1 | 2 | 3 | 4 | 5 | 6 | 7 | 8 |

Ti = OFDM Tone i
A = Arbitrate
Note $T_1 = T_{37} = T_{73} = \ldots = T_{253}$

In summary, the key features of the invention are as follows:
- the RU (during the Arbitration stage) uses single or multiple OFDM tones to signal that it has data to send;
- the RU indicates that it has data to send by energizing the OFDM tone. No energy in the tone indicates that the RU does not have data to send at this time.
- Arbitration Group Number and Tone numbers are assigned so no two RUs share the same Tone numbers within an AGN;
- the number of tones assigned to an RU, though normally one, can be varied to include several in circumstances where the channel is degraded;
- tone power is measured with respect to the noise floor (alternately, if noise floor cannot be measured, a fixed threshold is used);
- the uplink messages can be ordered by sending either the RU ID, or the AGN/Tone number on the downlink during the transmission (data transfer) stage;
- the design is scalable; as more RUs are added, the number of valid AGNs can be increased.

The present invention addresses many of the problems present in prior art collision-based uplink algorithms such as DSMA/CD. The maximum channel utilization goes from approximately 55% to greater than 90%. Since the new scheme avoids collisions, no data is discarded due to collisions. The average amount of time required to access the channel is reduced due to the increased throughput and the lack of collisions.

A specific OFDM communication system has been presented above to help demonstrate key aspects of the present invention. However, the concept of the present invention is not limited to any particular modulation or communication scheme. Other variations and embodiments of the present invention will occur to those skilled in the art.

What is claimed is:

1. A method for receiving uplink data messages at a base station, without collisions, from a plurality of remote units, the method comprising:
   assigning, at the base station, a plurality of unique uplink request signals to a plurality of remote units, including a first unique uplink request signal to a first remote unit and a second unique uplink request signal to a second remote unit, wherein the unique uplink request signals are orthogonal signal components of TDMA, FDMA, CDMA, SDMA, or a combination thereof;
   monitoring the plurality of unique uplink request signals;
   simultaneously receiving monitored unique uplink request signals, including the first and second unique uplink request signals;
   in response to receiving the first and second unique uplink request signals, determining that the first and second remote units have data messages to transmit uplink; and
   authorizing the transmission of uplink data messages from the first and second remote units to the base station.

2. The method of claim 1 wherein a plurality of frequency tones are included, and in which the assignment of a unique uplink request signal includes assigning a frequency tone from the plurality of frequency tones to each of the first plurality of remote units.

3. The method of claim 1 wherein a plurality of time slots are included, and in which the assignment of a unique uplink request signal includes assigning a time slot from the plurality of time slots to each of the plurality of remote units.

4. The method of claim 1 wherein a plurality of spreading codes are included, and in which the assignment of the unique uplink request signal includes assigning a spreading code from the plurality of spreading codes to each of the plurality of remote units.

5. The method of claim 2 further comprising: establishing an arbitration state, the establishment of the arbitration state including: transmitting a request for unique uplink request signals from the plurality of remote units; and in response to the request for unique uplink request signals, monitoring the plurality of unique uplink request signals for a response; and the method further comprising:
   establishing a data transfer state including: sending instructions to the first and second remote units for the transmission of uplink data messages; and receiving the uplink data messages from the first and second remote units.

6. The method of claim 5 in which the requesting of uplink request signals includes transmitting an arbitration state signal to the plurality of remote units.

7. The method of claim 6 in which the sending of instructions to the first and second remote unit for the transmission of uplink data messages includes transmitting a data transfer signal to the first and second remote units.

8. The method of claim 7 in which the assignment of frequency tones from the plurality of frequency tones to a plurality of remote units includes the plurality of frequency tones being orthogonal to one another with respect to frequency.

9. The method of claim 8 in which the simultaneous reception of the monitored unique uplink request signals includes simultaneously receiving orthogonal frequency tones.

10. The method of claim 9 further comprising: simultaneously receiving orthogonal frequency tones in a plurality of time slots.

11. The method of claim 10 further comprising: following the reception of the monitored unique uplink request signals, and preceding the establishment of the data transfer state, organizing a first sequence of remote unit uplink data message transmissions;
   in which the sending of instructions for the transmission of uplink data messages includes granting permission to transmit uplink data messages in the first sequence; and
   in which the reception of the uplink data messages includes receiving uplink data messages in the first sequence.

12. The method of claim 11 in which the establishment of the data transfer state includes:
   decoding the uplink data messages;
   sending decode status messages indicating whether the uplink data messages have been unsuccessfully decoded;
   following the data transfer state, generating another request for unique uplink request signals from the plurality of remote units; monitoring the plurality of unique uplink request signals; and in response to sending unsuccessful decode messages, receiving unique uplink request signals requesting permission to retransmit uplink data messages from the remote units.

13. The method of claim 7 in which the simultaneous reception of the monitored unique uplink request signals includes transmitting frequency tones from the plurality of frequency tones having a random phase relationship to one another.

14. The method of claim 11 further comprising: assigning each of the plurality of remote units a unique identification;
   tracking requests to uplink data messages, and assigning the uplink data messages in a sequence using the remote unit identification; and
   in which the assignment of a unique identification to each remote unit includes selecting an identification scheme from the group including remote unit identification numbers and an identification based on each remote unit having a unique combination of frequency tones and time slots.

15. The method of claim 10 in which the assignment of frequency tones from the plurality of frequency tones to a plurality of remote units includes assigning at least two tones from the plurality of frequency tones to each remote unit from the plurality of remote units.

16. A method for a remote unit to uplink data messages to a base station without collisions, the method comprising:
   receiving a request for unique uplink request signals, wherein the unique uplink request signals, assigned by the base station, are orthogonal signal components of TDMA, FDMA, CDMA, SDMA, or a combination thereof;

in response to the request for unique uplink request signals, transmitting a unique frequency tone when the remote unit has a message to uplink; and in response to transmitting the unique frequency tone, receiving instructions for sending the uplink data message.

17. The method of claim 16 further comprising:

in response to the request for unique uplink request signals, transmitting unique frequency tones in a predetermined time slot.

18. A remote unit for transmitting requests to uplink data message to a base station without collisions, the remote unit comprising:

a receiver having an input to accept solicitations for unique uplink request signals; and a transmitter having an output to provide a unique uplink request signal selected from a plurality of orthogonal signal components of TDMA, FDMA, CDMA, SDMA, or a combination thereof, which is assigned at the base station and uniquely identifies the remote unit, the transmitter sending the unique signal in response to the solicitation of unique uplink request signals, to indicate the existence of a data message for transmission uplink.

19. A method for receiving uplink data messages at a base station from a plurality of remote units without collisions, the method comprising:

assigning, at the base station, a unique uplink request signal to each remote unit from a first plurality of remote units; wherein the unique uplink request signals are orthogonal signal components of TDMA, FDMA, CDMA, SDMA, or a combination thereof;

monitoring unique uplink request signals;

simultaneously receiving a second plurality of unique uplink request signals, from among the first plurality of assigned unique uplink request signals, which correspond to a second plurality of remote units from among the first plurality of remote units; and in response to receiving the second plurality of unique uplink request signals, organizing a collision-free sequence of uplink data messages from the second plurality of remote units.

20. A method for a base station to identify a remote unit, the method comprising:

assigning, at the base station, a plurality of unique identification signals to a plurality of remote units, including a first unique identification signal to a first remote unit, wherein the unique identification signals are orthogonal signal components of TDMA, FDMA, CDMA, SDMA, or a combination thereof;

monitoring the unique identification signals;

in response to receiving the first unique identification signal, identifying the first remote unit.

21. The method of claim 20 wherein a plurality of frequency tones is included, and in which the assignment of a unique identification signal includes assigning a frequency tone from plurality of frequency tones to the first remote unit.

22. The method of claim 21 in which the assignment of a frequency tone from the plurality of frequency tones includes the plurality of frequency tones being orthogonal to each other.

23. The method of claim 21 wherein a plurality of time slots is included, and in which the assignment of a unique identification signal includes assigning a time slot from the plurality of time slots to the first remote unit.

24. The method of claim 21 wherein a plurality of spreading codes is included, and in which the assignment of a unique identification signal includes assigning a spreading code from the plurality of spreading codes to the first remote unit.

25. A communication system for receiving uplink data messages at a base station without collisions, the system comprising:

a base station having a port to transmit and receive messages, the base station establishing an arbitration state to request unique uplink request signals and to monitor unique uplink request signals, wherein the unique unlink request signals, assigned at the base station, are orthogonal signal components of TDMA, FDMA, CDMA, SDMA, or a combination thereof, and wherein the unique uplink request signals are assigned by the base station;

a first remote unit having a port in communication with the base station to transmit and receive messages, the first remote unit transmitting a first unique uplink request signal to the base station in response to receiving the request for unique uplink request signals;

a second remote unit having a port in communication with the base station to transmit and receive messages, the second remote unit transmitting a second unique uplink request signal to the base station in response to receiving the request for unique uplink request signals; and in which the base station monitors unique uplink request signals received simultaneously from the first and second remote units.

26. The system of claim 25 in which the base station, in response to receiving the first and second unique uplink request signals, establishes a data transfer state to receive the uplink data messages from the first and second remote units in a non-interfering sequence; and in which the first and second remote units transmit uplink data messages in response to uplink instructions from the base station.

27. The system of claim 26 further comprising:

a plurality of remote units, including the first and second remote units, communicating with the base station to receive requests for unique uplink request signals, each one of the plurality of remote units transmitting a unique uplink request signal which represents a request to uplink a data message, and each one of the plurality of remote units receiving uplink data message transmission instructions from the base station in response to that remote unit transmitting its unique uplink request signal.

28. The system of claim 27 in which the unique uplink request signal of each of the plurality of remote units includes a frequency tone selected from a plurality of unique frequency tones.

29. The system of claim 28 in which each of the plurality of frequency tones is orthogonal to one another with respect to frequency.

30. The system of claim 27 in which the unique uplink request signal of each of the plurality of remote units includes the assignment of a spreading code from a plurality of unique spreading codes.

31. The system of claim 27 in which each of the plurality of remote units has a unique identifier; and in which the base station uses the remote unit unique identifiers in transmissions to provide uplink data message sequence instructions to the remote units.

32. The system of claim 31 in which the unique identification for each of the plurality of remote units is selected from the group including remote unit identification numbers and an identification based on each remote unit having a unique uplink request signal.

33. The system of claim 31 in which the base station decodes each uplink data message and transmits a decode status indicating whether the uplink data message has been successfully decoded.

34. The system of claim 29 in which unique uplink request signals from the plurality of remote units include simultaneous frequency tone transmissions from the plurality of frequency tones having a random phase relationship to one another.

35. The system of claim 27 in which the unique uplink request signal of each of the plurality of remote units includes the assignment a time slot selected from a plurality of time slots.

* * * * *

UNITED STATES PATENT AND TRADEMARK OFFICE
CERTIFICATE OF CORRECTION

PATENT NO. : 6,967,937 B1 Page 1 of 1
DATED : November 22, 2005
INVENTOR(S) : Eamonn Gormley It is certified that error appears in the above-identified patent and that said Letters Patent is hereby corrected as shown below:

Column 16,
Line 11, "unlink" should be -- uplink --.

Signed and Sealed this

Twenty-first Day of February, 2006

JON W. DUDAS
*Director of the United States Patent and Trademark Office*